(12) United States Patent
Santa Cruz et al.

(10) Patent No.: US 6,189,897 B1
(45) Date of Patent: Feb. 20, 2001

(54) STEERING ACTUATED SHOCK SYSTEM FOR VEHICLES

(76) Inventors: Cathy D. Santa Cruz, 7630 Tholl Dr., Reno, NV (US) 89506; Thomas E. Dines, P.O. Box 222, Sierra City, CA (US) 96125; Michael F. Gyorfi, 201 Cousteau Pl., Davis, CA (US) 95616

( * ) Notice: Under 35 U.S.C. 154(b), the term of this patent shall be extended for 0 days.

(21) Appl. No.: 09/390,177

(22) Filed: Sep. 7, 1999

(51) Int. Cl.[7] .................................................. B60G 21/045
(52) U.S. Cl. ........................... 280/5.506; 280/5.507; 280/124.106; 280/124.16
(58) Field of Search ...................... 280/6.157, 5.506, 280/5.507, 5.508, 5.514, 124.106, 124.159, 124.16, 124.161; 180/277

(56) References Cited

U.S. PATENT DOCUMENTS

| | | | |
|---|---|---|---|
| 4,076,275 | * | 2/1978 | Hiruma ................................ 280/707 |
| 4,361,346 | * | 11/1982 | Harris ................................. 280/707 |
| 4,546,959 | * | 10/1985 | Tanno ............................... 267/64.15 |
| 4,961,481 | * | 10/1990 | Bartz .................................... 188/130 |
| 5,348,112 | * | 9/1994 | Vaillancourt ........................ 180/227 |
| 5,725,239 | * | 3/1998 | Molina .............................. 280/5.503 |
| 5,785,344 | * | 7/1998 | Vandewal et al. ................ 267/64.16 |
| 5,794,324 | * | 8/1998 | Schaldach .............................. 29/559 |
| 5,823,305 | * | 10/1998 | Richardson et al. ................. 188/275 |
| 6,102,418 | * | 8/2000 | Runkel .......................... 280/124.106 |

* cited by examiner

Primary Examiner—Paul N. Dickson
Assistant Examiner—Faye M. Fleming (57) ABSTRACT

A hydraulic shock system adapter apparatus for use in combination with a pre-existing shock system and pre-existing steering arm which are typically installed on a vehicle. With the apparatus being actuated by the steering arm and automatically increases dampening compression on the outside shock and decreases dampening compression on the inside shock when the vehicle is turned.

6 Claims, 6 Drawing Sheets

STEERING ACTUATED SHOCK SYSTEM FOR VEHICLES

FIELD OF THE INVENTION

This invention substantially relates to devices that are used to reduce accidental rollover of vehicles. But more particularly relates to a shock system adapter apparatus which is automatically actuated by the steering system and increases dampening compression on the outside shock and decreases dampening compression on the inside shock when the vehicle is turning.

BACKGROUND OF THE INVENTION

In the past, many types of shock systems have been taught for use on vehicles. However, such shock systems typically function independently from the steering system and they do not specifically reduce accidental tipping of the vehicle while turning, as taught by the present invention.

For example, U.S. Pat. No. 5,348,112 teaches a "MOTORCYCLE HEIGHT ADJUSTER" which is hydraulically actuated and includes a manually actuated height adjustment knob. This type of shock system allows the rider to adjust the height of the motorcycle according to their individual preference.

Another example of a prior art shock system is disclosed within U.S. Pat. No. 4,961,481 wherein taught is a "HYDRAULIC ACTUATION SYSTEM". This system is functional for its intended use which is to allow a vehicle occupant to manually control or "set" the stiffness of the vehicle shock absorbers, similar to the previous reference.

Other examples of prior art shock systems, or the like are taught within U.S. Pat. Nos. 4,546,959, 5,823,305, and 5,725,239. However, none of the references provide an adapter apparatus which is compatible with a pre-existing shock system, nor do they include unique metering valves, nor novel simple mechanical linkage, as taught by the present invention.

The applicants therefore contend that there is a need for a shock system adapter apparatus that is attachable and automatically activated by the existing vehicle steering system. And when the vehicle is turned, the dampening compression of the outside shock is increased while the dampening compression of the inside shock is decreased. Thus, altering the normal center of gravity of the vehicle, and reducing the chance of body roll while turning.

SUMMARY OF THE INVENTION

It is therefore an object of the present invention to provide a steering actuated shock system apparatus for vehicles that may either be installed at the point of manufacture, or the system can easily be retrofitted onto the existing vehicle shock system after market.

It is a further object of the present invention to provide a steering actuated shock system for vehicles that is adjustable by the user, in a manner which allows the user to adjust the shock dampening compression according to their individual needs.

Yet another object of the present invention is to provide a steering actuated shock system for vehicles that is attachable to the pre-existing steering arm mechanism on the vehicle, and is automatically actuated when the vehicle is turned.

Still another object of the present invention is to provide a steering actuated shock system for vehicles which is of very simple construction and economical to manufacture and install.

Also another object of the present invention is to provide a steering actuated shock system which may be manufactured and sold as an accessory item for vehicles. For example, such a system is especially useful as an accessory item for snowmobiles, quads, three-wheeled vehicles, race vehicles, four-wheel drive vehicles, pickup trucks, or the like.

Yet a further object of the present invention is to provide a steering actuated shock system for vehicles that enhances the overall performance of the vehicle.

Still a further object of the present invention is to provide a steering actuated shock system for vehicles that may include instructions and the mechanical linkage may be color-coded for easy installation.

Other objects and advantages will be seen when taken into consideration with the following specification and drawings.

DETAILED DESCRIPTION OF THE DRAWINGS

Referring now in detail to the drawings wherein like characters refer to like elements throughout the various drawings.

Within FIGS. 1–6 (arrow 10) substantially represents an overview of the present invention which is a hydraulic shock system adapter apparatus (arrow 10) which can either be installed onto a vehicle at the point of manufacture, or the apparatus (arrow 10) may be installed after market. It is to be understood the apparatus (arrow 10) is substantially universal and is operable with any vehicle of choice, such as snowmobiles, quads, three-wheeled vehicles, race vehicles, four wheel drive vehicles, or the like. Furthermore, the following specification describes multiple embodiments for the present invention. Each of which achieve the desired end result, which is substantially to provide a steering actuated shock system for vehicles that automatically increases dampening compression on the outside shock and decreases dampening compression on the inside shock when the vehicle is turning. It is to be understood other embodiments may achieve the same end result although not shown. Therefore other embodiments are inherent within the invention and the invention is not to be limited to the embodiments as shown.

Figure 1:
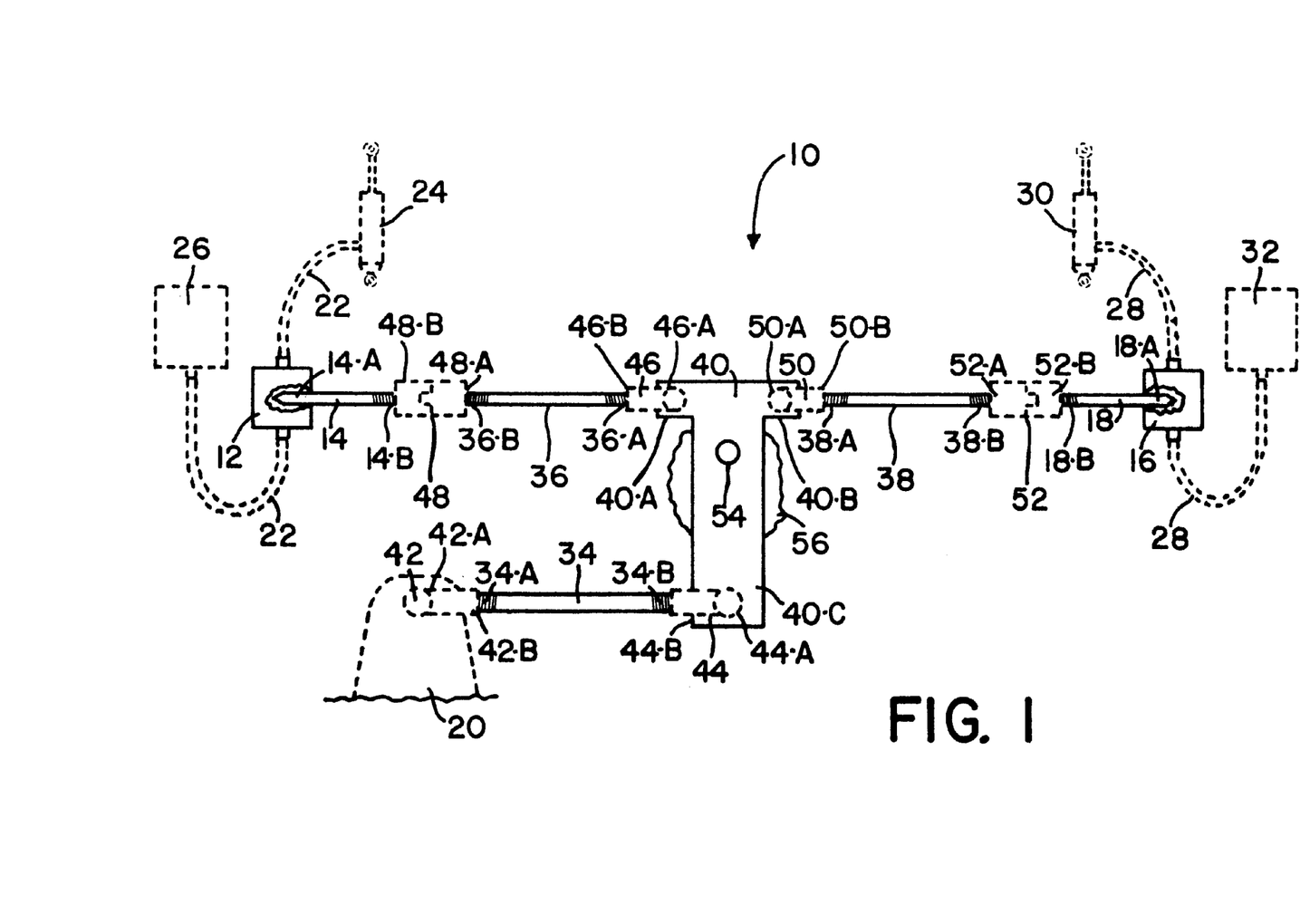
FIG. 1 is substantially an overview of one embodiment for the present invention, wherein the apparatus is shown substantially in a central operating position.
Figure 2:
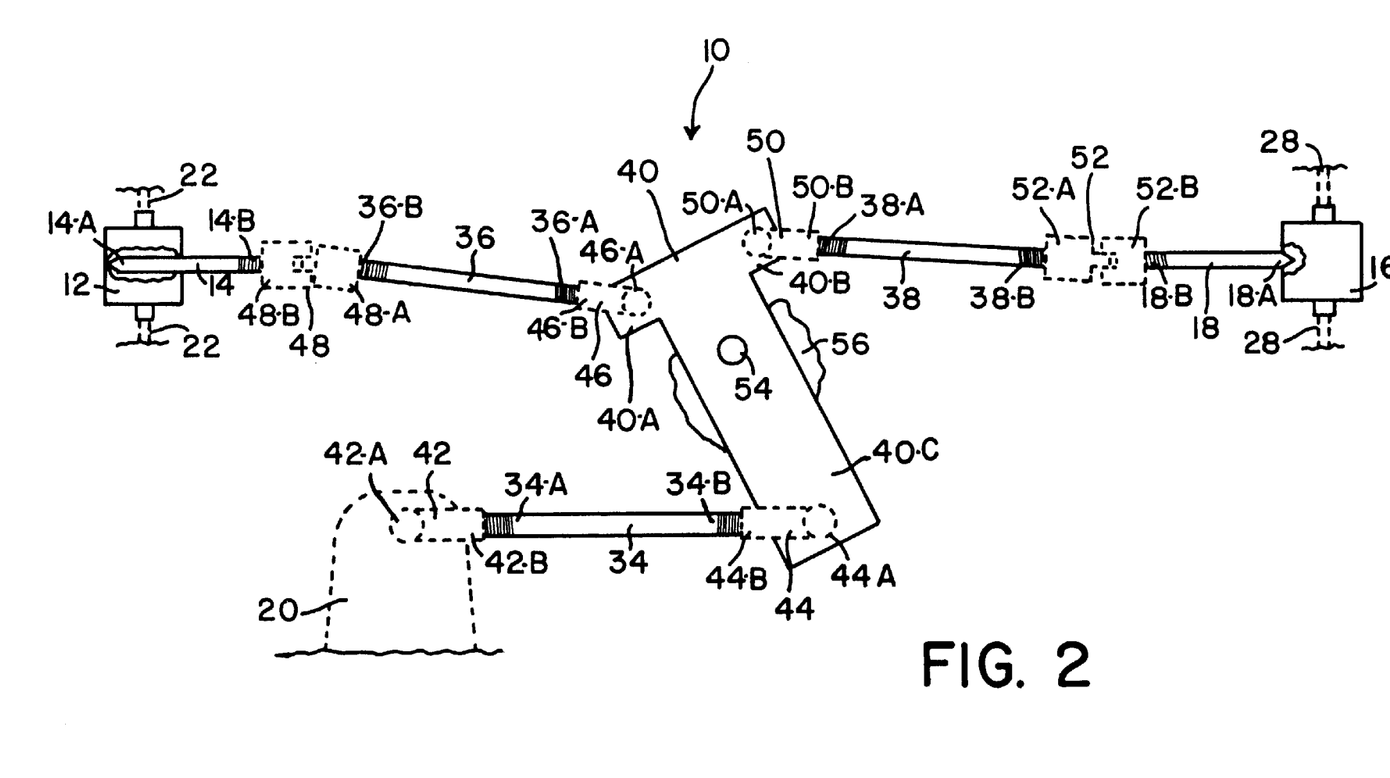
FIG. 2 is substantially an overview of the present apparatus when in a second operating position.
Figure 3:
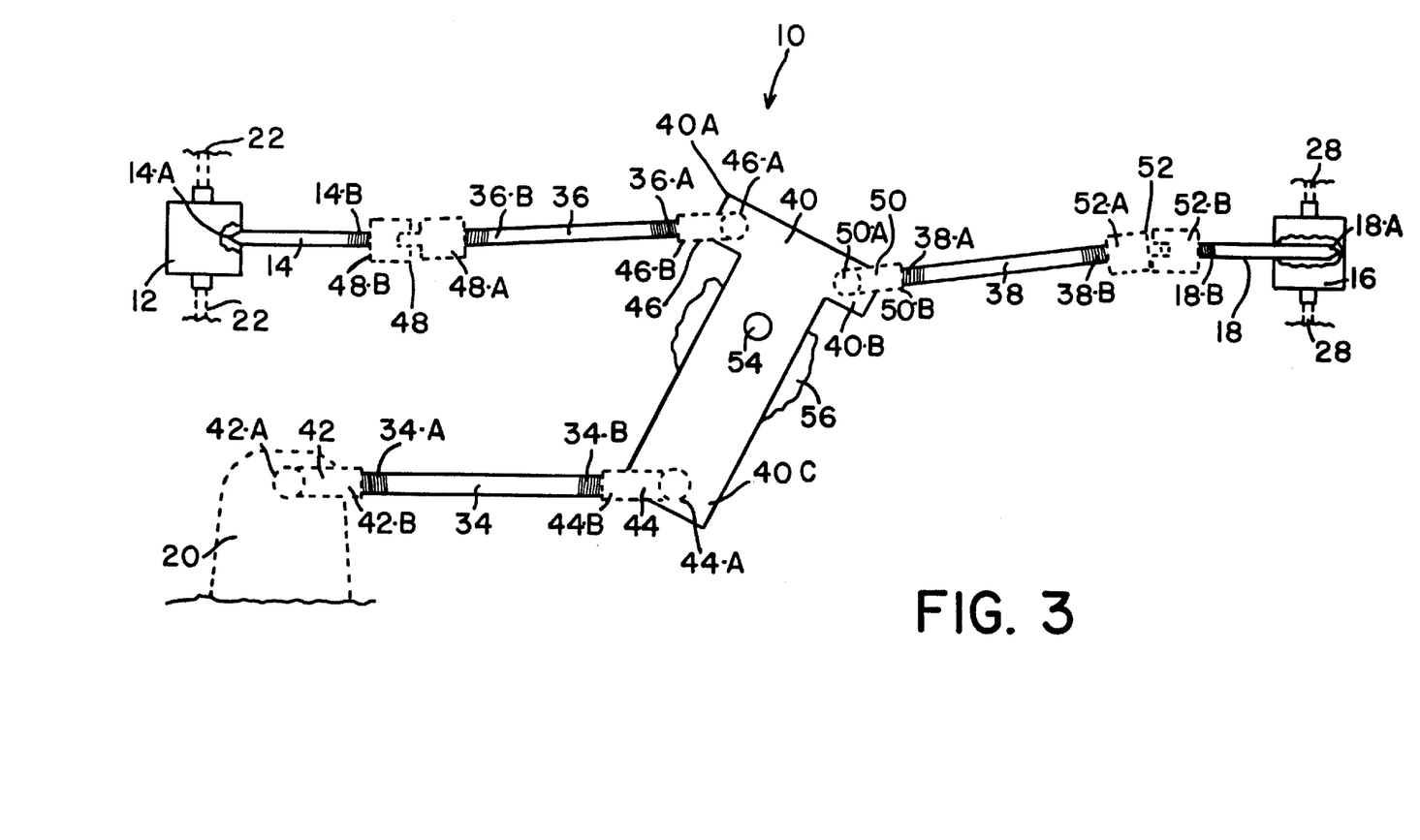
FIG. 3 is substantially an overview of the present apparatus when in a third operating position.

In FIGS. 1–3, we show a first embodiment for the present invention comprising of the following. A first fluid metering valve unit (12), a first needle valve (14) having a first end (14-A) and a second end (14-B). With the first end (14-A) of the first needle valve (14) being slidably engaged within the first fluid metering valve unit (12). A second fluid metering valve unit (16), a second needle valve (18) having a first end (18-A) and a second end (18-B). With the first end (18-A) of the second needle valve (18) being slidably engaged within the second fluid metering valve unit (16), and mechanical linkage (later described in detail) for interconnecting each fluid metering valve unit (12 & 16) and each needle valve (14 & 18) to a pre-existing prior art steering arm (20). The first fluid metering valve unit (12) being installed in line onto a pre-existing prior art first fluid line (22) at a location of engineering choice, somewhere between a pre-existing prior art first shock absorber (24) and a pre-existing prior art first pressurized fluid reservoir (26). The second fluid metering valve unit (16) being installed in line onto a second pre-existing prior art second fluid line (28) at a location of engineering choice, somewhere between a pre-existing prior art second shock absorber (30) and a pre-existing prior art second pressurized fluid reservoir (32).

Each needle valve (14 & 18) having substantially a closed position, a central position, and an open position. With the closed position restricting fluid flow, while the open position does not restrict fluid flow. And the pre-existing prior art steering arm (20) having a neutral position, a right position, and a left position.

Whereby, it will now be seen when the pre-existing prior art steering arm (20) is in the neutral position, each needle valve (14 & 18) automatically assumes the central position, as depicted in FIG. 1.

When the pre-existing prior art steering arm (20) is in the right position, the first needle valve (14) automatically assumes the closed position and the second needle valve (18) automatically assumes the open position simultaneously, as depicted in FIG. 2. Whereby, when the pre-existing prior art steering arm (20) is in the right position, the first pre-existing prior art shock absorber (24) has increased dampening compression, while the second pre-existing prior art shock absorber (30) has decreased dampening compression.

When the pre-existing prior art steering arm (20) assumes the left position, the first needle valve (14) automatically assumes the open position and the second needle valve (18) automatically assumes the closed position simultaneously, as depicted in FIG. 3. Whereby, when the pre-existing prior art steering arm (20) assumes the left position, the second pre-existing prior art shock absorber (30) has increased dampening compression, while the first pre-existing prior art shock absorber (24) has decreased dampening compression.

Referring now to the previously noted mechanical linkage as depicted in FIGS. 1–3 which substantially comprises the following. An attachment rod (34) having a first end (34-A) and a second end (34-B). A first attachment arm (36) having a first end (36-A) and a second end (36-B). A second attachment arm (38) having a first end (38-A) and a second end (38-B), and a T-shaped bracket (40) having a first short leg (40-A), a second short leg (40-B) and a long leg (40-C).

The first end (34-A) of attachment rod (34) having attachment means for fixedly yet pivotably attaching the first end (34-A) of attachment rod (34) to the pre-existing prior art steering arm (20). It is to be understood any suitable attachment means of engineering choice may be used, such as a bracket, etc. Or as we have shown, the attachment means for fixedly attaching the first end (34-A) of attachment rod (34) to the pre-existing prior art steering arm (20), is a first prior art ball-joint (42) having a first end (42-A), a second end (42-B) and internal threads. With the first end (42-A) being fixedly attached at a location of choice onto pre-existing prior art steering arm (20) by any suitable attachment means of engineering choice, such as by a bolt and nut, welding, etc. First end (34-A) of attachment rod (34) having external threads which are of a shape and size to be inserted into the second end (42-B) of first prior art ball joint (42) and be threadably engaged within the internal threads.

The second end (34-B) of attachment rod (34) having attachment means for fixedly yet pivotably attaching the second end (34-B) of attachment rod (34) to long leg (40-C). It is to be understood any suitable attachment means of engineering choice may be used, such as a bracket, etc. Or as we have shown, the attachment means for fixedly yet pivotably attaching the second end (34-B) of attachment rod (34) to the long leg (40-C) is a second prior art ball-joint (44) having a first end (44-A), a second end (44-B) and internal threads.

With the first end (44-A) of second prior art ball-joint (44) being fixedly attached at a location of choice onto long leg (40-C) by any suitable attachment means of engineering choice, such as by a bolt and nut, welding, etc. Second end (34-B) of attachment rod (34) having external threads which are of a shape and size to be inserted into the second end (44-B) of second prior art ball joint (42) and be threadably engaged within the last said internal threads.

The first end (36-A) of first attachment arm (36) having attachment means for attaching the first end (36-A) of the first attachment arm (36) to first short leg (40-A). It is to be understood any suitable attachment means of engineering choice may be used, such as a bracket, etc. Or as we have shown, the attachment means for fixedly yet pivotably attaching the first end (36-A) of the first attachment arm (36) to the first short leg (40-A) is a third prior art ball-joint (46) having a first end (46-A), a second end (46-B) and internal threads.

With the first end (46-A) of third prior art ball-joint (46) being fixedly attached at a location of choice onto short leg (40-A) by any suitable attachment means of engineering choice, such as by a bolt and nut, welding, etc. First end (36-A) of first attachment arm (36) having external threads which are of a shape and size to be inserted into the second end (46-B) of third prior art ball joint (46) and be threadably engaged within the last said internal threads.

The second end of the first attachment arm (36) having attachment means for attaching the second end (36-B) of the first attachment arm (36) to the second end (14-B) of the first needle valve (14). It is to be understood any suitable attachment means of engineering choice may be used. For example, we have shown the attachment means for attaching the second end (36-B) of the first attachment arm (36) to the second end (14-B) of the first needle valve (14) is a first prior art universal joint (48) having a first end (48-A) and a second end (48-B). With the first end (48-A) of first prior art universal joint (48) having an internal threaded cavity, and the second end (36-B) of first attachment arm (36) having external threads which are of a shape and size to be inserted into the internal threaded cavity and be threadably engaged therein. Second end (48-B) of first prior art universal joint (48) having an internal threaded cavity and the second end (14-B) of first needle valve (14) having external threads which are of a shape and size to be inserted into last said internal threaded cavity and be threadably engaged therein.

The first end (38-A) of second attachment arm (38) having attachment means for attaching the first end (38-A) of the second attachment arm (38) to second short leg (40-B). It is to be understood any suitable attachment means of engineering choice may be used, such as a bracket, etc. Or as we have shown, the attachment means for fixedly yet pivotably attaching the first end (38-A) of the second attachment arm (38) to the second short leg (40-B) is a fourth prior art ball-joint (50) having a first end (50-A), a second end (50-B) and internal threads.

With the first end (50-A) of fourth prior art ball-joint (50) being fixedly attached at a location of choice onto second short leg (40-B) by any suitable attachment means of engineering choice, such as by a bolt and nut, welding, etc. First end (38-A) of second attachment arm (38) having external threads which are of a shape and size to be inserted into the second end (50-B) of fourth prior art ball joint (50) and be threadably engaged within the last said internal threads.

The second end (38-B) of the second attachment arm (38) having attachment means for attaching the second end (38-B) of the second attachment arm (38) to the second end (18-B) of the second needle valve (18). It is to be understood any suitable attachment means of engineering choice may be used. For example, we have shown the attachment means for attaching the second end (38-B) of the second attachment arm (38) to the second end (18-B) of the second needle valve (18) is a second prior art universal joint (52) having a first end (52-A) and a second end (52-B). With the first end (52-A) of second prior art universal joint (52) having an internal threaded cavity, and the second end (38-B) of second attachment arm (38) having external threads which are of a shape and size to be inserted into the last said internal threaded cavity and be threadably engaged therein. Second end (52-B) of second prior art universal joint (50) having an internal threaded cavity and the second end (18-B) of second needle valve (18) having external threads which are of a shape and size to be inserted into last said internal threaded cavity and be threadably engaged therein.

It is to be understood the above described mechanical linkage as shown in FIGS. 1–3 is very functional for vehicles having the pre-existing prior art steering arm (20) located other than in substantially a central position between each of the shocks (24 & 30). Also, T-shaped bracket (40) is fixedly yet pivotably attached by a pivot pin (54) onto an affixed existing structure (56) on the vehicle of user choice. This allows the T-shaped bracket (40) to be pivotably positionable between each of the noted operating positions. Furthermore, if so desired, each of the components of the mechanical linkage may be color coded for easy installation if the apparatus is to be installed after market. For example, the attachment rod (34) may be colored red, with T-shaped bracket (40) being colored white, with each of the attachment arms (36 & 38) being colored blue, and each of the needle valves being colored yellow, or the like.

Still further, it is to be understood each of the attachment arms (36 & 38) may be in the form of a cable, or the like, depending on engineering choice. It is to be further understood that if the attachment rod (34) and the attachment arms (36 & 38) are the preferred embodiment, this is very advantageous as each are threaded, and this allows the apparatus (arrow 10) to be variably adjustable in length for easy installation within different vehicle shock system compartments.

Figure 4:
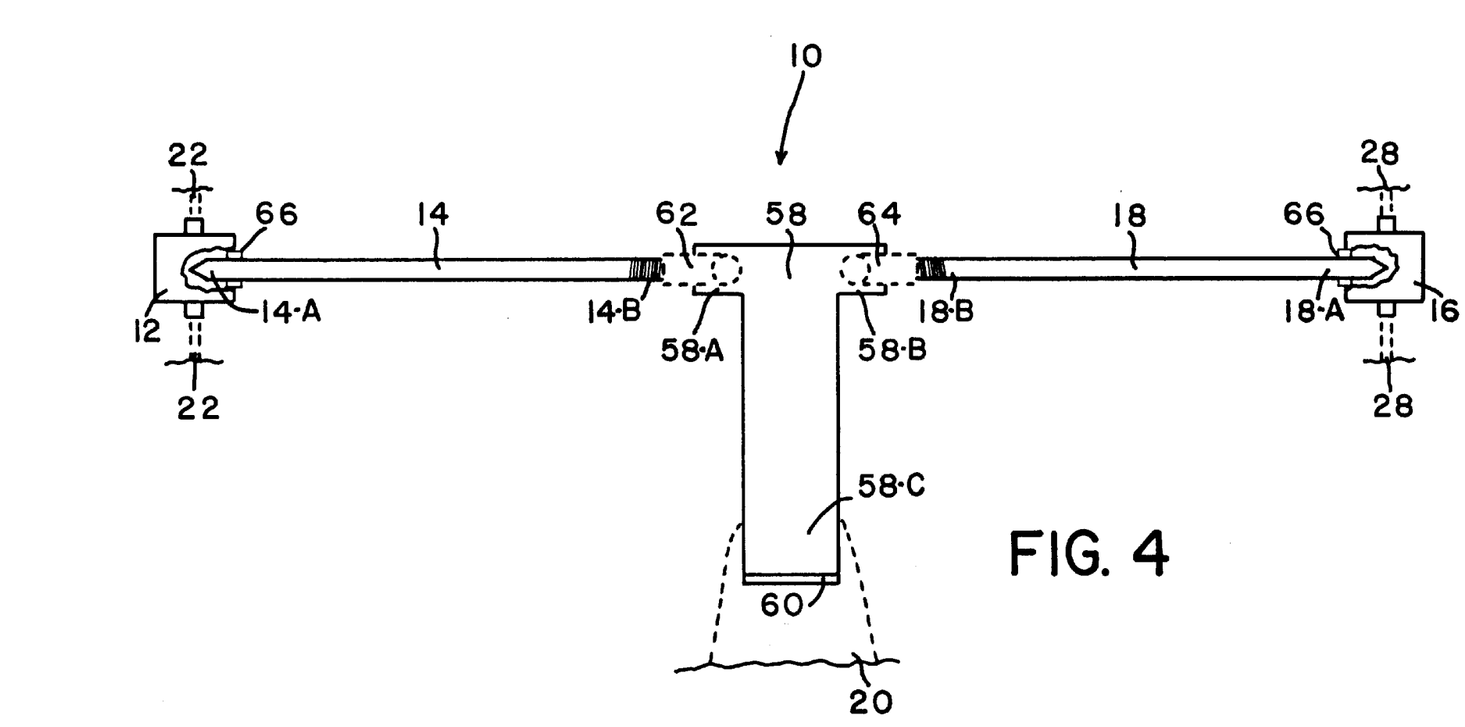
FIG. 4 is substantially an overview of a second embodiment drawn to a different scale for the present invention, wherein the apparatus is shown substantially in a central operating position.
Figure 5:
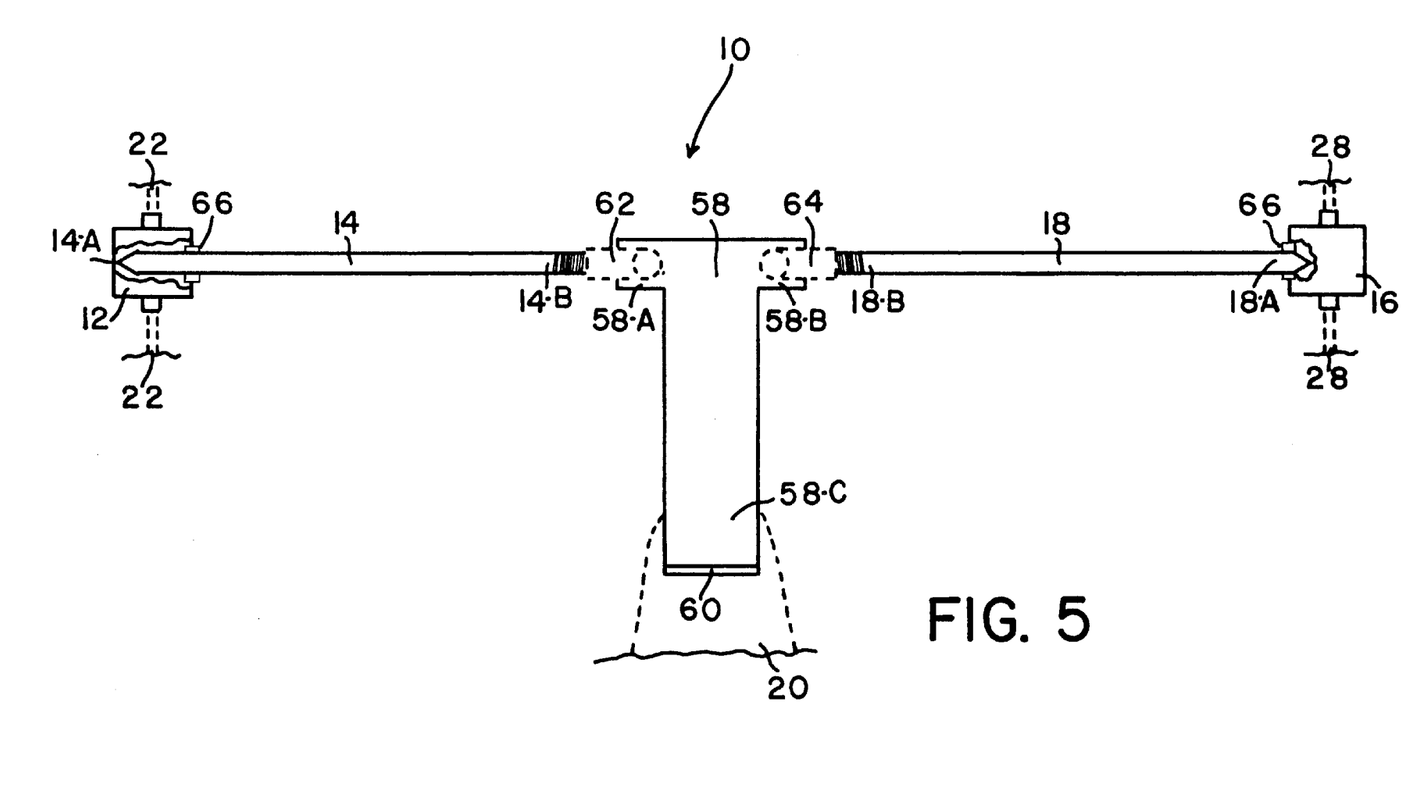
FIG. 5 is substantially an overview of the embodiment of FIG. 4 of the present apparatus when in a second operating position.
Figure 6:
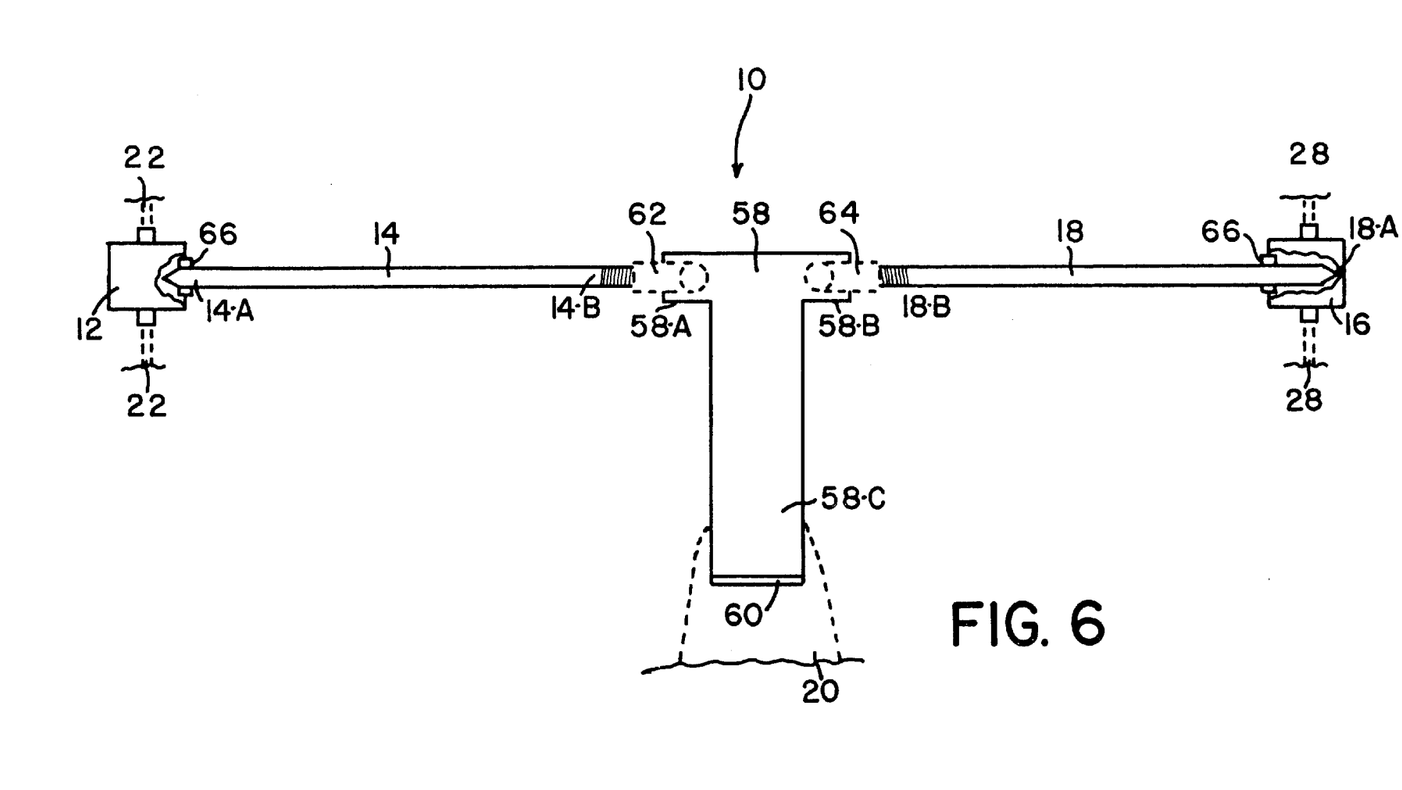
FIG. 6 is substantially an overview of the embodiment of FIG. 4 of the present apparatus when in a third operating position.

Referring now to FIGS. 4–6, wherein we show a second embodiment for the present invention with the mechanical linkage substantially comprising of the following components. A T-shaped bracket (58) having a first short leg (58-A), a second short leg (58-B), and a long leg (58-C).

With long leg (58-C) having attachment means for fixedly attaching long leg (58-C) to the pre-existing prior art steering arm (20). It is to be understood any suitable attachment means of engineering choice may be used, such as a bolt and nut, etc. Or as we have shown the attachment means for fixedly attaching long leg (58-C) to the pre-existing prior art steering arm (20) is by long leg (58-C) of T-shaped bracket (58) being welded by weld (60) onto pre-existing prior art steering arm (20). Short leg (58-A) of T-shaped bracket (58) having attachment means for attaching first short leg (58-A) of T-shaped bracket (58) to the second end (14-B) of first needle valve (14). It is to be understood any suitable attachment means of engineering choice may be used, such as a bracket, etc. Or as we have shown, the attachment means for fixedly attaching first short leg (58-A) of T-shaped bracket (58) to the second end (14-B) of first needle valve (14) is by second end (14-B) of first needle valve (14) being threadably engaged within a first prior art ball-joint (62), with the first prior art ball-joint (62) being fixedly attached onto first short leg (58-A) by suitable attachment means of engineering choice, such as by a bolt and nut, or the like. Second short leg (58-B) of T-shaped bracket (58) having attachment means for attaching second short leg (58-B) to the second end (18-B) of second needle valve (18). It is to be understood any suitable attachment means of engineering choice may be used, such as a bracket, etc. Or as we have shown, the attachment means for fixedly attaching second short leg (58-B) of T-shaped bracket (58) to the second end (18-B) of second needle valve (18) is by second end (18-B) of second needle valve (14) being threadably engaged within a second prior art ball-joint (64), with the second prior art ball-joint (64) being fixedly attached onto second short leg (58-B) by suitable attachment means of engineering choice, such as by a bolt and nut, or the like.

It is to be further understood within each of the embodiments, each fluid metering valve unit (12 & 16), includes sealing means of engineering choice, such as a grommet (66) as shown in FIGS. 4, 5 & 6. Any sealing means may be used which will not allow fluid to escape from within each fluid metering valve unit (12 & 16). Furthermore, although not shown, it is to be understood each fluid metering valve unit (12 & 16) may include unique components that allow for adjustment of the amount of fluid contained therein.

Also, it is to be understood that this premise may be used with pneumatic shock systems where applicable.

Although the invention has been herein shown and described in what is conceived to be the most practical and preferred embodiment, it is recognized that departures may be made therefrom within the scope and spirit of the invention, which is not to be limited to the details disclosed herein but is to be accorded the full scope of the claims so as to embrace any and all equivalent devices and apparatus's.

Having described the invention what we claim as new and wish to secure by Letters Patent is:

1. Hydraulic shock system adapter apparatus comprising: a first fluid metering valve unit; a first needle valve having a first end and a second end; said first end of said first needle valve being slidably engaged within said first fluid metering valve unit, a second fluid metering valve unit; a second needle valve having a first end and a second end; said first end of said second needle valve being slidably engaged within said second fluid metering valve unit; and a mechanical linkage interconnecting each said fluid metering valve unit and each said needle valve to a pre-existing steering arm, said first fluid metering valve unit being installed in line onto a pre-existing first fluid line at a location between a pre-existing first shock absorber and a pre-existing first pressurized fluid reservoir, said second fluid metering valve unit being installed in line onto a pre-existing second fluid line at a location between a pre-existing second shock absorber and a pre-existing second pressurized fluid reservoir, each said needle valve having a closed position, a central position and an open position, said closed position restricts fluid flow, said open position does not restrict said fluid flow, and said pre-existing steering arm having a neutral position, a right position and a left position, whereby:

when said pre-existing steering arm is in said neutral position, each said needle valve assumes said central position, and when said pre-existing steering arm is in said right position, said first needle valve assumes said closed position and said second needle valve assumes said open position simultaneously, whereby:

when said pre-existing steering arm is in said right position, said first pre-existing shock absorber has increased dampening compression, while said second pre-existing shock absorber has decreased dampening compression, and when said pre-existing steering arm assumes said left position, said first needle valve assumes said open position while said second needle valve assumes said closed position simultaneously, whereby:

when said pre-existing steering arm assumes said left position, said second pre-existing shock absorber has increased dampening compression, while said first pre-existing shock absorber has decreased dampening compression.

2. The hydraulic shock system adapter apparatus of claim 1 wherein said mechanical linkage comprising: an attachment rod having a first end and a second end; a first attachment arm having a first end and a second end; a second attachment arm having a first end and a second end; and a T-shaped bracket having a first short leg, a second short leg and a long leg; said first end of said attachment rod having attachment means for fixedly attaching said first end of said attachment rod to said pre-existing steering arm, said second end of said attachment rod having attachment means for fixedly attaching said second end of said attachment rod to said long leg, said first end of said first attachment arm having attachment means for attaching said first end of said first attachment arm to said first short leg, said second end of said first attachment arm having attachment means for attaching said second end of said first attachment arm to said second end of said first needle valve, said first end of said second attachment arm having attachment means for attaching said first end of said second attachment arm to said second short leg, and said second end of said second attachment arm having attachment means for attaching said second end of said second attachment arm to said second end of said second needle valve.

3. The mechanical linkage of claim 2 wherein said attachment means for fixedly attaching said first end of said attachment rod to said pre-existing steering arm is a first ball-joint having a first end, a second end and internal threads, said first end of said first ball-joint being welded onto said pre-existing steering arm, and said first end of said attachment rod having external threads which are of a shape and size to be inserted into said second end of said first ball-joint and be threadably engaged within said internal threads, said attachment means for fixedly attaching said second end of said attachment rod to said long leg is a second ball-joint having a first end, a second end, and internal threads, said first end of said second ball-joint being welded onto said long leg, and said second end of said attachment rod having external threads which are of a shape and size to be inserted into said second end of said second ball-joint and be threadably engaged within last said internal threads, said attachment means for attaching said first end of said first attachment arm to said first short leg is a third ball-joint having a first end, a second end, and internal threads, said first end of said third ball-joint being welded onto said first short leg, said first end of said first attachment arm having external threads which are of a shape and size to be inserted into said second end of said third ball-joint and be threadably engaged within last said internal threads, said attachment means for attaching said second end of said first attachment arm to said second end of said first needle valve is a first universal joint having a first end and a second end, said first end of said universal joint having an internal threaded cavity, said second end of said first attachment arm having external threads which are of a shape and size to be inserted into said internal threaded cavity and be threadably engaged therein, said second end of said first universal joint having an internal threaded cavity, said second end of said first needle valve having external threads which are of a shape and size to be inserted into last said internal threaded cavity and be threadably engaged therein, said attachment means for attaching said first end of said second attachment arm to said second short leg is a fourth ball-joint having a first end, a second end, and internal threads, said first end of said fourth ball-joint being welded onto said second short leg, said first end of said second attachment arm having external threads which are of a shape and size to be inserted into said second end of said fourth ball joint and be threadably engaged therein, said attachment means for attaching said second end of said second attachment arm to said second end of said second needle valve is a second universal joint having a first end and a second end, said first end of said second universal joint having an internal threaded cavity, said second end of said second attachment arm having external threads which are of a shape and size to be inserted into last said internal threaded cavity and be threadably engaged therein, said second end of said second universal joint having an internal threaded cavity, and said second end of said second needle valve having external threads which are of a shape and size to be inserted into last said internal threaded cavity and be threadably engaged therein.

4. The mechanical linkage of claim 2 is color coded which allows for easy installation when said apparatus is installed within a vehicle after market.

5. The hydraulic shock system adapter apparatus of claim 1 wherein said mechanical linkage comprising: a T-shaped bracket having a first short leg, a second short leg, and a long leg, said long leg having attachment means for fixedly attaching said long leg to said pre-existing steering arm, said first short leg having attachment means for attaching said first short leg to said second end of said first needle valve, and said second short leg having attachment means for attaching said second short leg to said second end of said second needle valve.

6. The mechanical linkage of claim 5 wherein said attachment means for fixedly attaching said long leg to said pre-existing steering arm is by said long leg being welded onto said pre-existing steering arm, said attachment means for attaching said first short leg to said second end of said first needle valve is by said second end of said first needle valve being threadably engaged within a first ball-joint with said first ball-joint being fixedly attached onto said first short leg, and said attachment means for attaching said second short leg to said second end of said second needle valve is by said second end of said second needle valve being threadably engaged within a second ball-joint with said second ball-joint being fixedly attached onto said second short leg.

* * * * *